Dec. 24, 1946.    L. S. BROWN ET AL    2,412,949
ROTARY ENGINE
Filed Sept. 14, 1942    9 Sheets-Sheet 1

INVENTORS
L. S. Brown, K. R. Brown,
F. L. Brown
BY
ATTYS

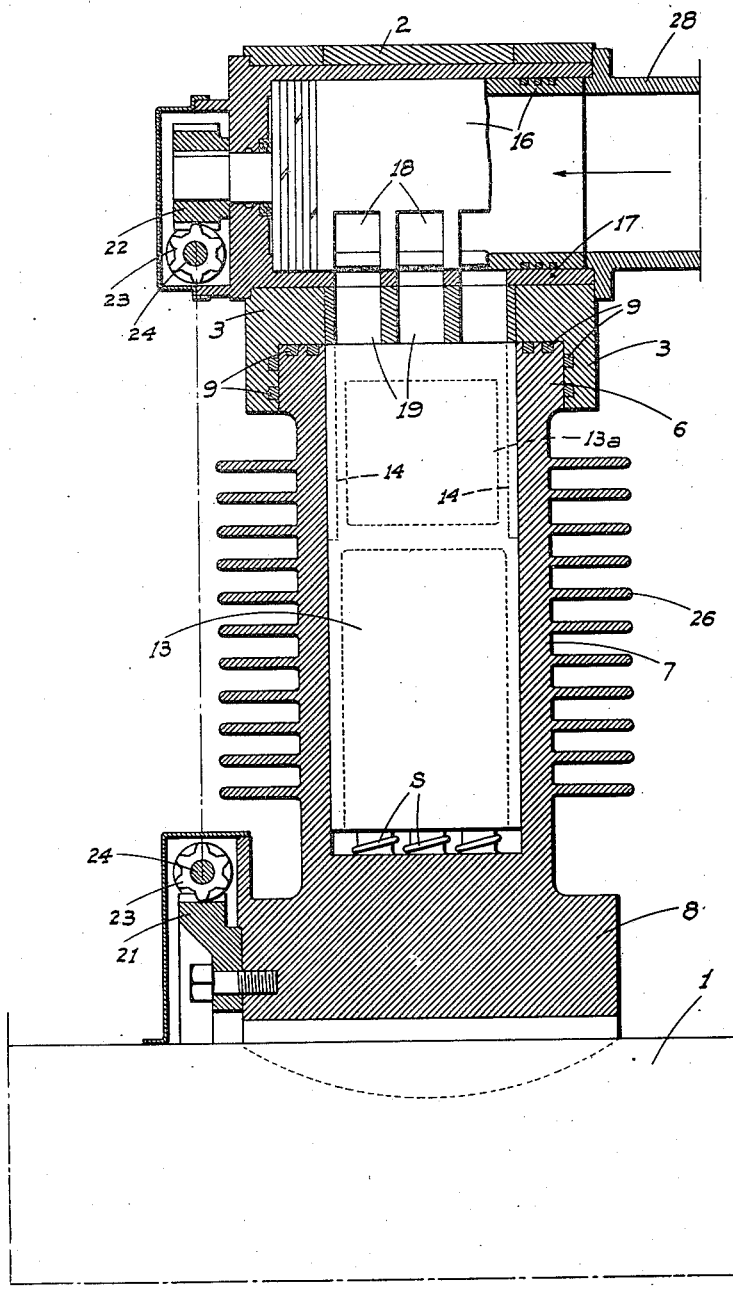

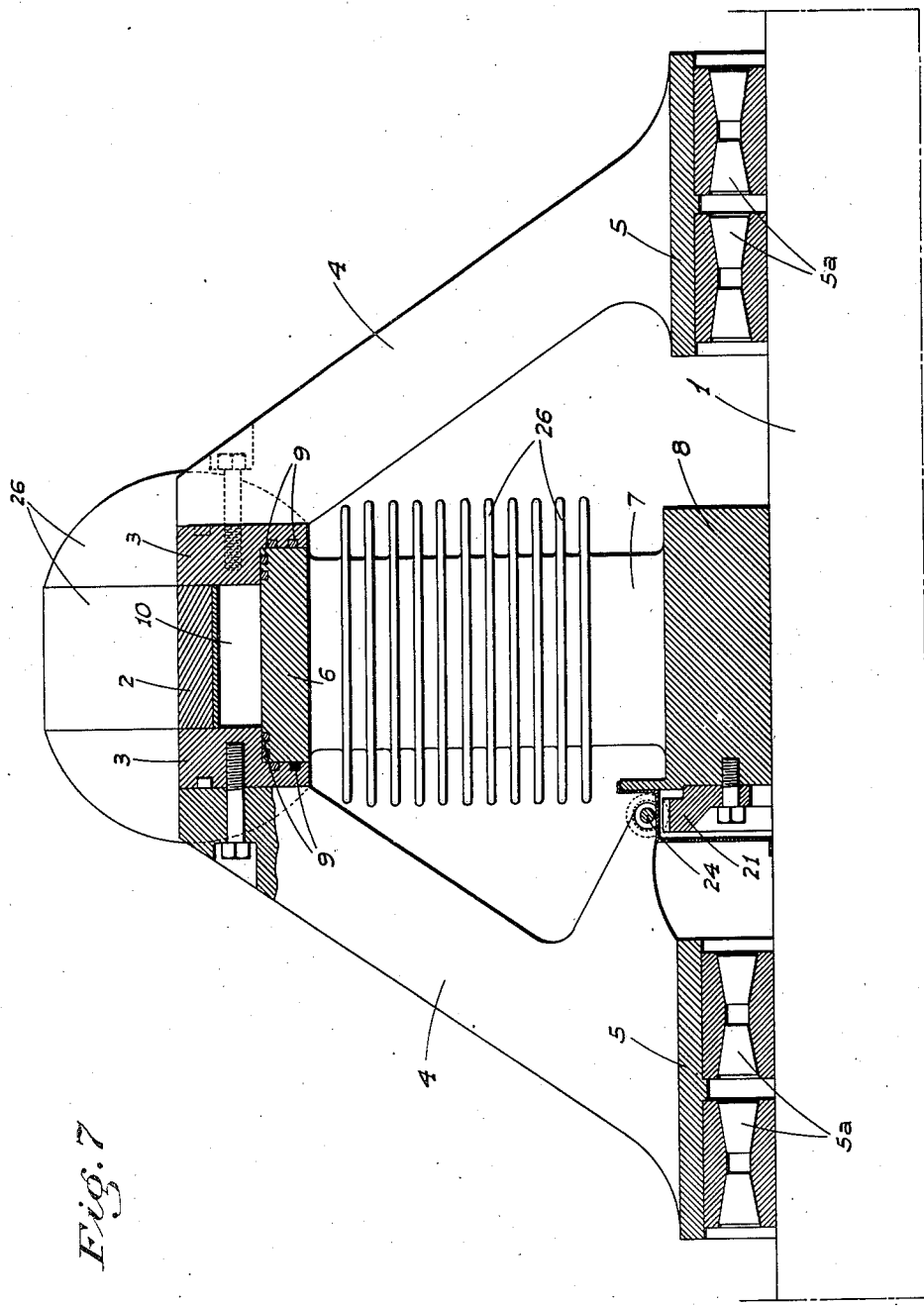

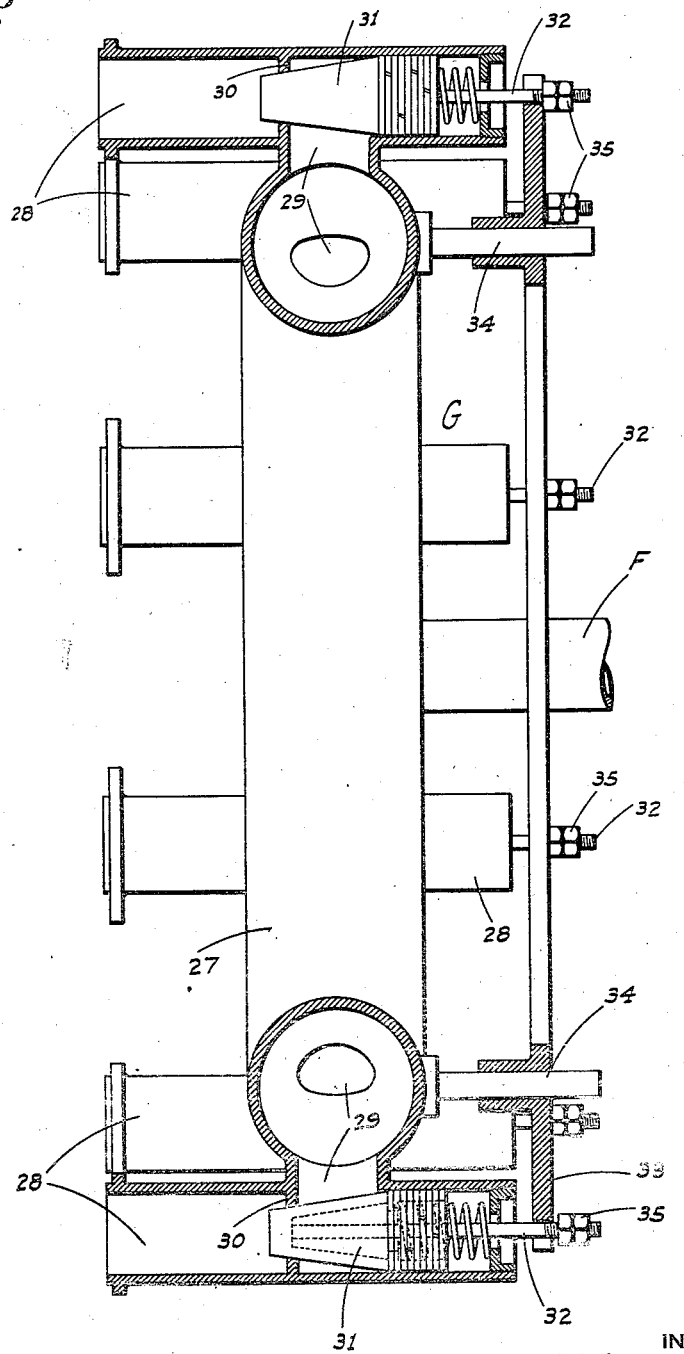

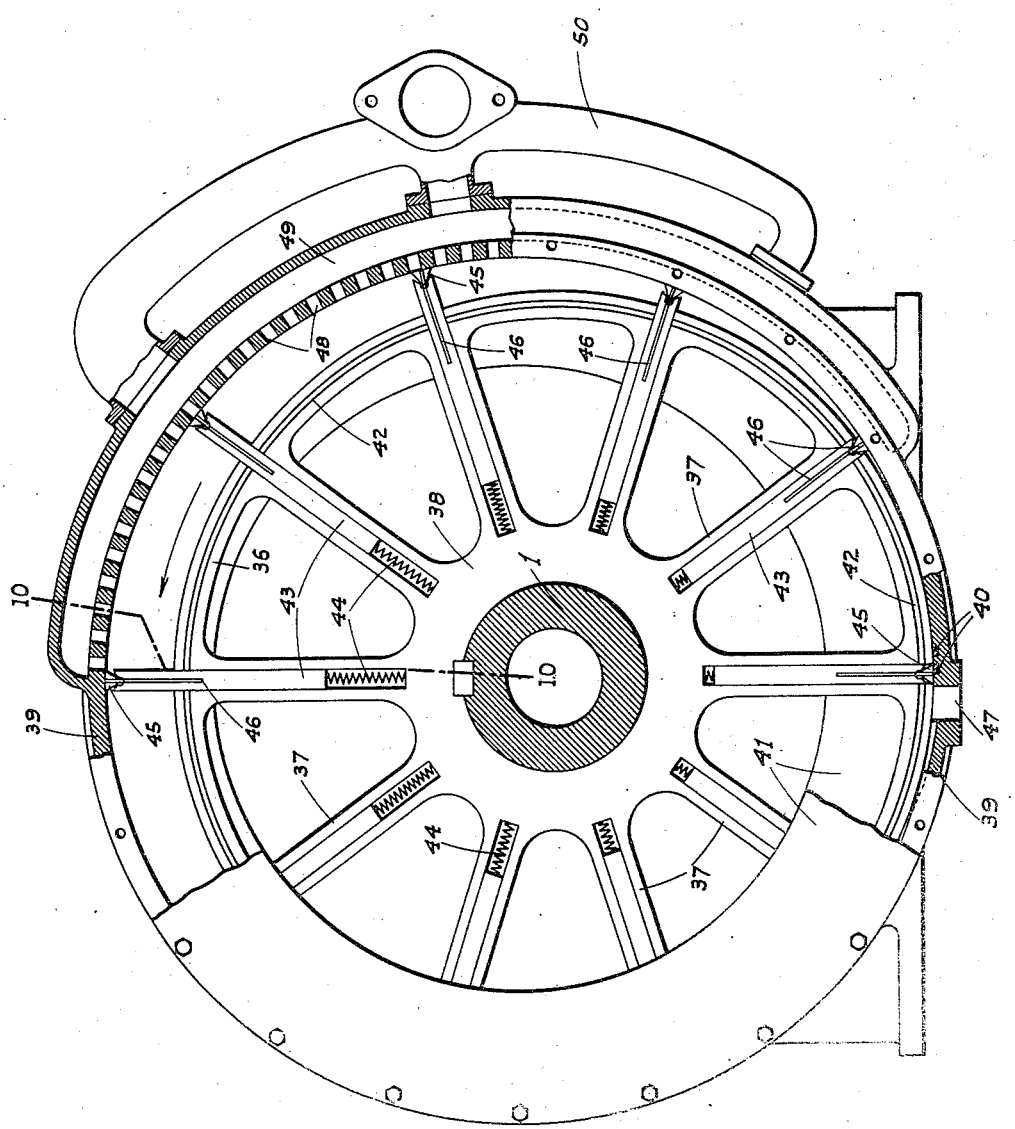

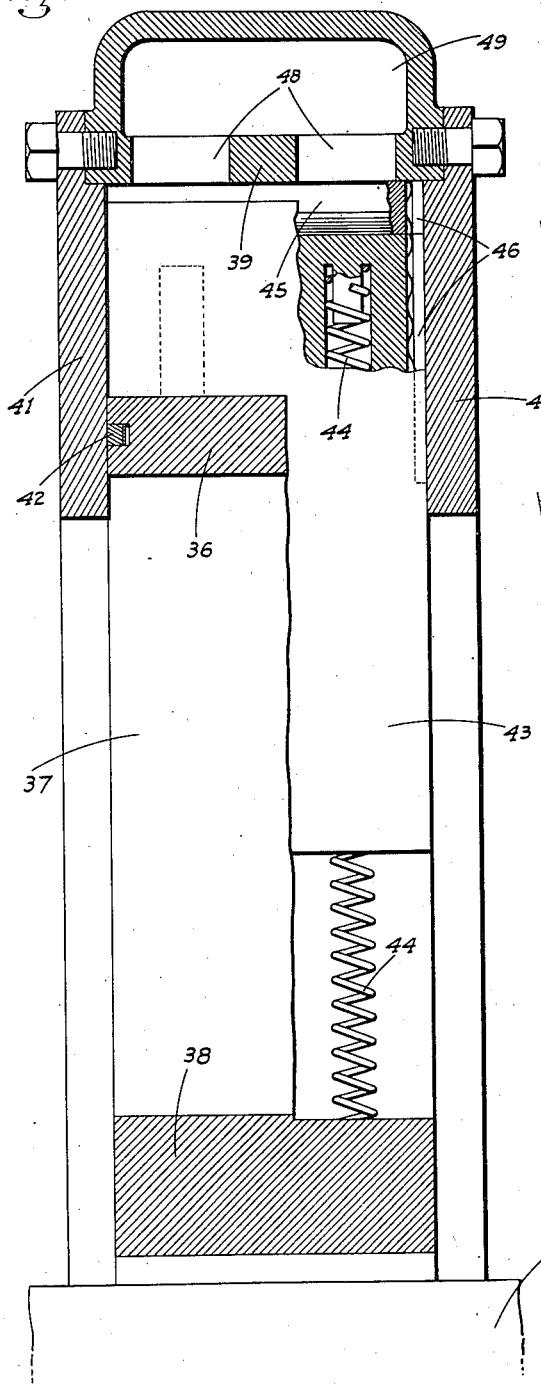
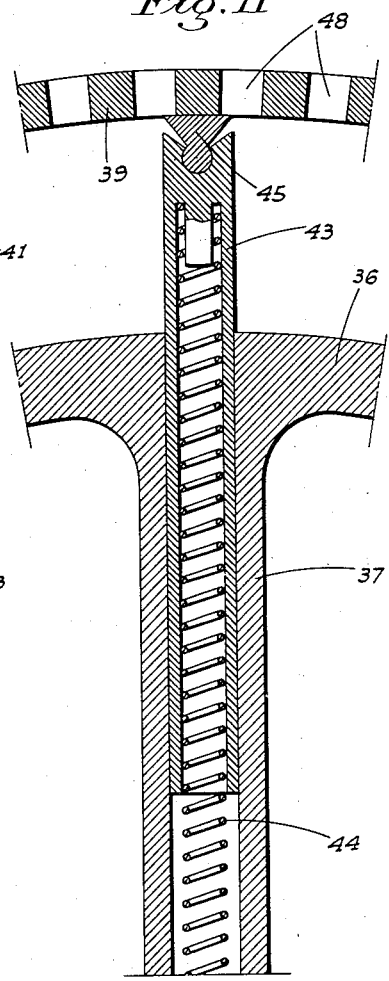

UNITED STATES PATENT OFFICE 2,412,949

ROTARY ENGINE

Luther S. Brown, Kenneth R. Brown, and Forrest L. Brown, Fresno, Calif., assignors of fifty per cent to Kyle and Company, Inc., Fresno, Calif., a corporation Application September 14, 1942, Serial No. 458,228

1 Claim. (Cl. 123—108)

This invention relates to an internal combustion engine of that type generally called a rotary engine, and which includes a stationary housing and a rotor unit fixed on a drive shaft and projecting into the housing, and forming therewith a plurality of enclosed chambers into which the fuel mixture is received, and which mixture is then fired to produce the desired driving and rotation of the rotor and shaft.

One object of the invention is to provide an engine of this kind having a plurality of firing or expansion chambers so arranged that a supply of fuel mixture will be delivered simultaneously into all the chambers and fired simultaneously. This provides equalized pressures all around the periphery of the housing and rotor so that the strains are better distributed, and a leverage on the drive shaft considerably greater than that possible with the crankshaft of an ordinary reciprocating engine is obtained. This results in a relative increase in power over a reciprocating engine of corresponding size and volumetric fuel mixture capacity.

In ordinary engine operation it is the common practice to draw the fuel mixture into the cylinders or firing chambers, at approximately atmospheric pressure, by vacuum action, the mixture being then compressed in the cylinders before it is fired. In our engine, on the other hand, the mixture is compressed before passing into the chambers, and such mixture is fired immediately the chambers have received the requisite amount of pressure. To provide an engine assembly including a means to compress and supply the compressed fuel mixture to the firing chambers forms another and important object of our invention. This invention, we believe, will largely eliminate compression-holding troubles heretofore considered more or less unavoidable in engines of this type.

The above defined assembly includes a compressor, and another object of the invention is to provide a rotor compressor having a number of circumferentially spaced air receiving and compressing pockets, and so constructed that each pocket at its point of maximum capacity, will be completely filled with air under a certain initial pressure without any material friction and consequent power losses being set up during such filling.

These and other objects we accomplish by means of such structure and relative arrangement of parts as will fully appear by a perusal of the following specification and claim.

In the drawings similar characters of reference indicate corresponding parts in the several views:

Figure 6 is a radial section of the engine substantially on the line 6—6 of Figure 3.

Figure 7 is a similar view substantially on the line 7—7 of Figure 2.

Figure 8 is a sectional elevation of a mixture reservoir-distributing manifold and control valve unit detached.

Figure 9 is an elevation partly in section of a compressor of the assembly.

Figure 10 is a radial section substantially on the line 10—10 of Figure 9.

Figure 11 is a fragmentary sectional elevation of the compressor showing the vane construction and mounting.

Figure 1:
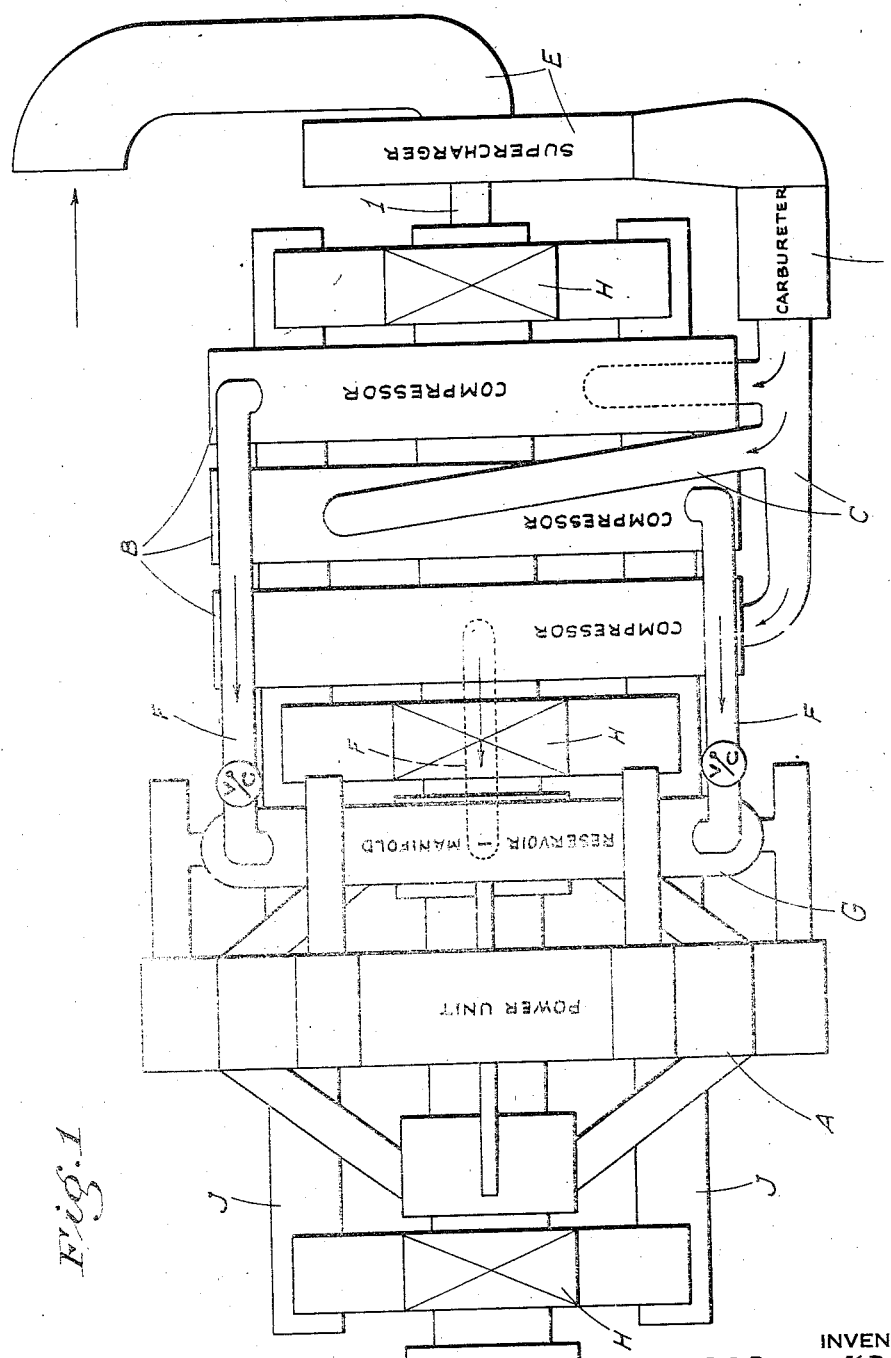
Figure 1 is a diagrammatic plan of a complete engine assembly.
Figure 2:
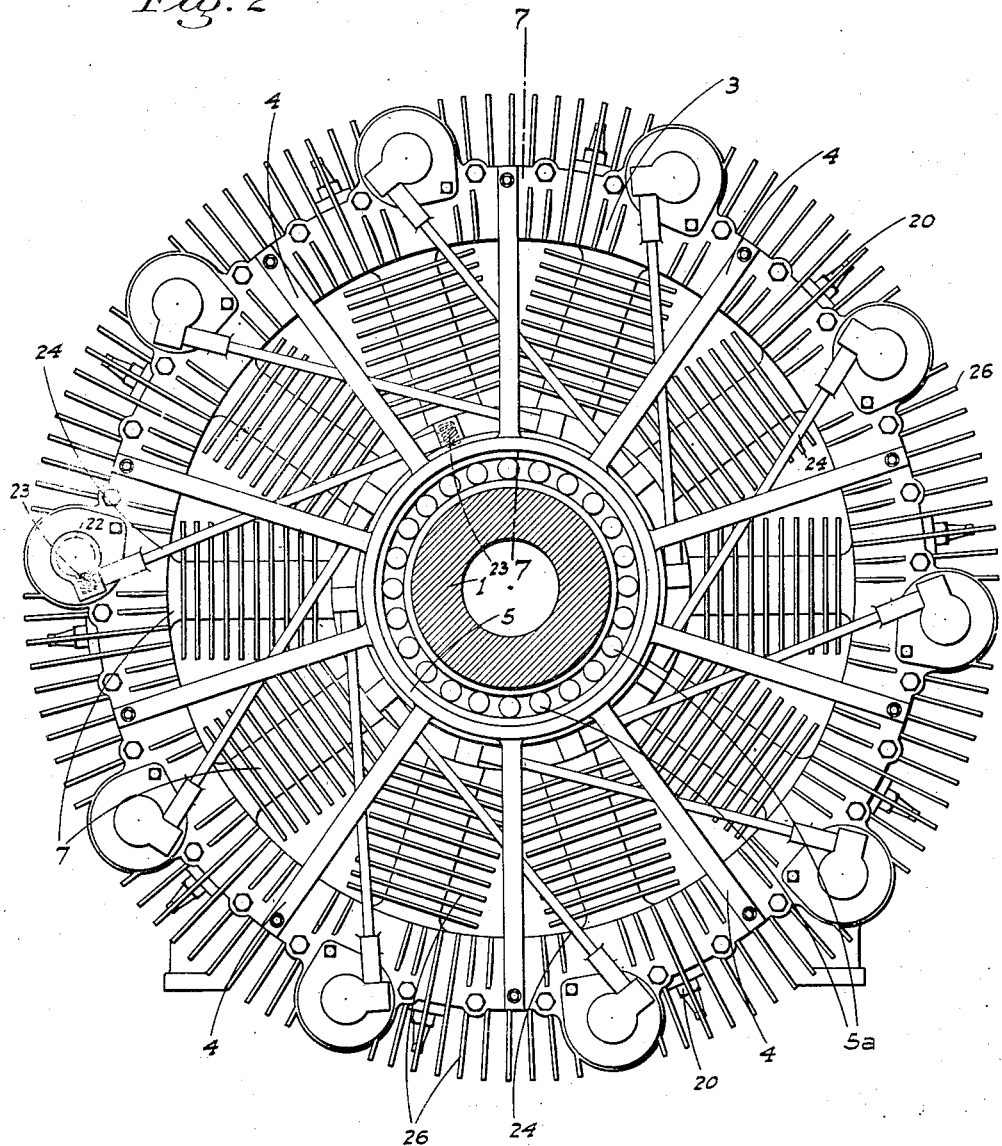
Figure 2 is an elevation of the power unit or engine proper of the assembly.
Figure 3:
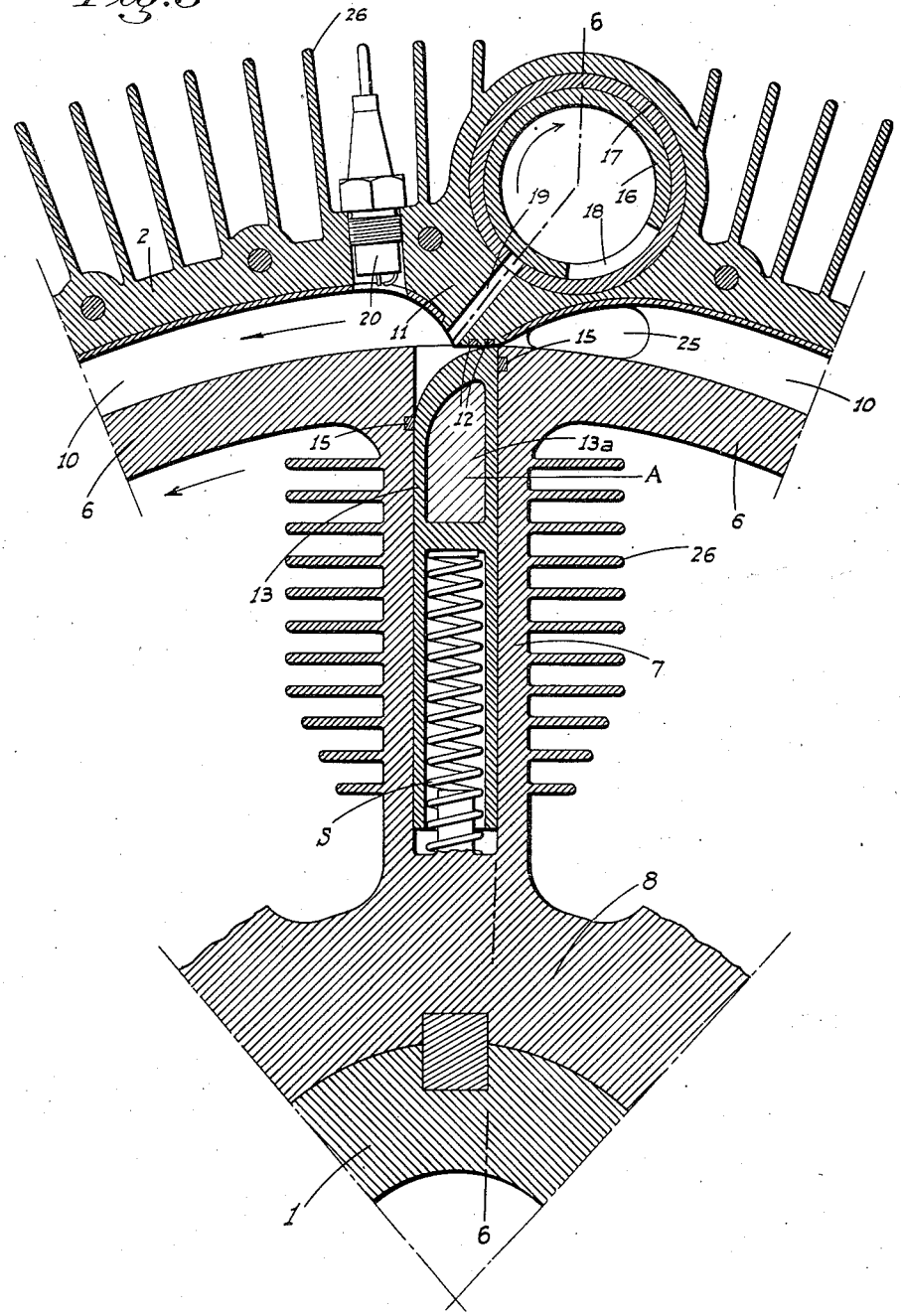
Figure 3 is a fragmentary sectional elevation of the engine showing the position of a vane and adjacent intake valve prior to the admission of the fuel mixture.

Referring now more particularly to the characters of reference on the drawings, and particularly at present to the diagrammatic showing of Fig. 1, the assembly comprises a rotary power unit A and a battery of rotary compressors B, the unit and compressors being mounted in line on a common drive shaft I which is driven by the rotor of the power unit, and which in turn drives the compressors. The compressors individually receive fuel mixture under a certain initial pressure from a common manifold C connected to the outlet of a suitable carburetor D, which in turn is connected to a supercharger E driven from the shaft I. The carburetor and supercharger may be of any desired conventional or standard type suitable for the purpose.

The compressed mixture from the individual compressors passes through checked conduits F leading therefrom to a manifold and reservoir unit G surrounding the shaft I between the power unit and the adjacent compressor. This manifold is connected to the individual control valves of the different firing chambers of the engine unit, as will be seen later.

All of the parts of the assembly, as above generally outlined, are mounted in line in as compact an arrangement as is practicable; the shaft 1 being supported at intervals by suitable bearings H, while the engine unit and the compressors, as well as the shaft bearings, are supported on bed members J, or otherwise as the type of service for which the engine is intended may determine.

Referring now more particularly to the construction of the engine unit itself, said unit comprises essentially a fixed housing and a rotor cooperating therewith. The housing is of ring-like form and comprises an outer circular body member 2 having sidewalls or skirts 3 projecting radially inward therefrom. For convenience of manufacture, the member 2 and sidewalls are initially separate from each other and are then securely bolted together to provide a rigid structure. The housing is supported in concentric relation with the shaft 1 by a plurality of radial arms 4 diverging from the sidewalls 3 and connected to sleeves 5 journaled on the shaft 1 with anti-friction bearings 5a. The rotor comprises a ring or band member 6 fitting between the walls 3 and having a plurality of what may be termed spokes 7 radiating from a hub 8 which is keyed onto the shaft 1 between the sleeves 5. The outer periphery of the band 6, which is concentric with the shaft 1, terminates short of the normal bore of the housing member 2 and is recessed at its sides into the walls 3 so as to form right angle shoulders, on which endless sealing rings 9 are disposed in circumferential and radial planes, as clearly shown in Figs. 6 and 7. This arrangement provides a continuous pressure-tight enclosed space between the rotor and housing, which is divided into a plurality of chambers 10 of equal size by abutments 11 projecting radially in from the radially outermost wall of the chambers and engaging the outer periphery of the rotor band with a running fit. Transverse sealing bars 12 in the abutments engage said peripheral surface of the rotor band. A trailing side of the abutments, relative to the direction of rotation of the rotor, is formed with a somewhat gradual concave curvature, while on their leading side the curvature of the abutments is quite abrupt.

Vanes 13 are slidable in the spokes 7, which are the same in number as the chambers 10 and are evenly spaced about the rotor. The vanes are of a width to fit snugly in the chambers between the walls 3 and are provided down the sides with their sealing bars 14 (see Fig. 4), while transverse sealing bars 15 are mounted in the spokes on opposite sides of the vanes. The leading face of each vane is convexly curved so that it may be easily depressed by contact with the trailing end of the abutments against the resistance of springs S which tend to force the vanes radially out. Said springs of course are enclosed in the spokes between the inner end of the spoke bore and the vanes, which are hollowed out as shown to receive the springs. Each vane is also formed with a hollow chamber 13a radially out from the spring receiving area thereof, in which a chemical cooling agent indicated at A may be retained if desired.

Figure 5:
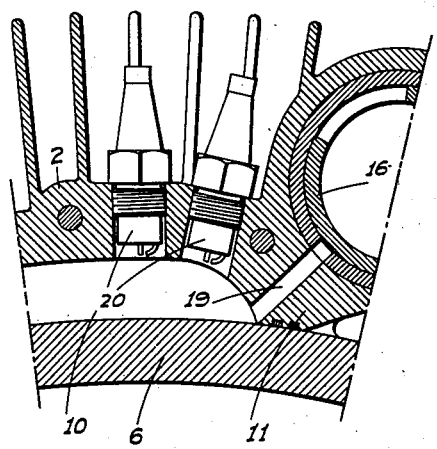
Figure 5 is a fragmentary sectional elevation of an engine showing a dual spark plug arrangement.

Admission of compressed fuel mixture from the manifold G into each chamber 10 is controlled by a hollow rotary valve 16 turnably mounted in a sleeve 17 extending transversely across the engine housing radially out from the corresponding chamber close to the adjacent abutment. The valve is peripherally ported, as at 18, to communicate with a passage 19 in the sleeve end abutment and leading to the corresponding firing chamber 10 immediately adjacent the leading end of the abutment. A spark plug 20 is mounted in the engine housing a short distance beyond the passage 19. If desired, or found advisable, two or more spark plugs, as shown in Fig. 5, may be used in each firing chamber, and arranged to be actuated in unison or successively as may be found best to insure a complete and more even burning of the fuel mixture, and thus give greater power.

Figure 4:
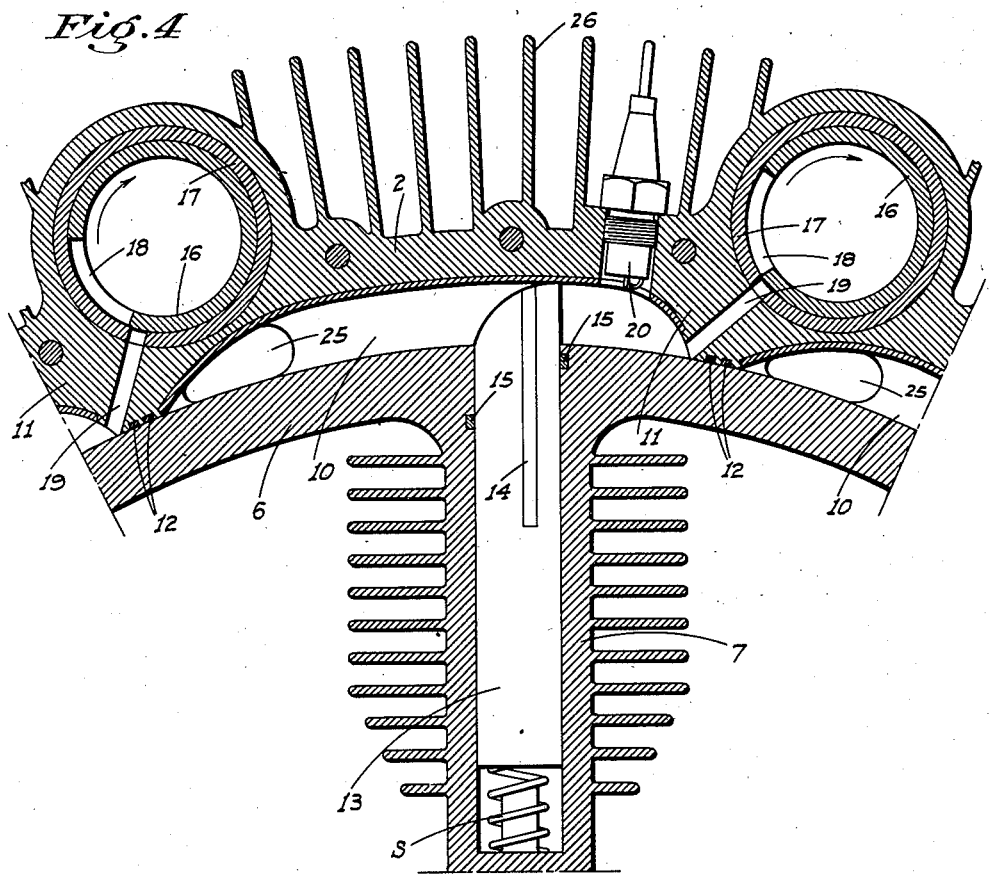
Figure 4 is a similar view showing the position of the vane and valve at the termination of the mixture admission movement of the valve.

The valve is arranged so as to be rotated a full revolution with the movement of the rotor and any one vane the full length of a chamber 10; while the valve porting is arranged and the valve timed so that said chamber will communicate with the interior of the valve from when the vane just passes beyond the passage 19 until it is a short distance beyond the plug 20, or substantially to the position shown in Fig. 4.

All of the valves are driven in unison and the proper timing assured by a suitable gear drive from the shaft 1. This drive, as here shown, comprises a master helical gear 21 secured on the hub 8 on one end thereof, helical gears 22 on the corresponding end of the different valves 16, helical pinions 23 engaging said gears 21 and 22, and shafts 24 connecting the pinions and journaled in connection with the housing and arms 4, as shown. The gears and pinions are preferably housed so as to retain lubricant.

The valves are open at the end opposite the gears, as shown in Fig. 6, for connection to the manifold outlet conduits and the reception of the compressed fuel mixture. Each chamber 10 is provided in one side adjacent the end furthest from the passage 19 with a lateral exhaust port 25.

For aviation use the housing and spokes may be provided with cooling fins 26, and since the spokes are radially in from the sidewalls of the housing, the spoke fins, as well as those on the housing, are freely exposed to air flowing lengthwise of the engine shaft, thus assuring proper cooling.

In operation, fuel mixture under pressure is delivered simultaneously and at the same pressure to all the chambers 10, and the mixture is then immediately fired in all the chambers, thus driving the vanes and rotor. As the vanes pass beyond and uncover the ports 25, the fired and expanded charges escape to the atmosphere.

The reservoir and manifold unit G, from which the compressed fuel mixture is constantly and evenly supplied to the open end of all the engine valves simultaneously, is shown in one form in Fig. 8, and comprises an endless circular tube-like body 27 surrounding and preferably concentric with the shaft 1. Axially extending conduits 28 are disposed a short distance radially out from the body and communicate intermediate their ends with the body by connecting outlet passages 29. The conduits are alined at one end with the several valves 16 and are flanged at said end for pressure-tight connection with the adjacent housing wall 3. Each conduit, between the passage 19 and its flanged end, is provided with an orificed cross wall 30 forming the seat for a spring-closed taper valve 31. This valve projects across the passage 29 and is slidably guided in the conduit beyond said passage in a pressure-tight manner, and is provided with an actuating stem 32 projecting from the end of the conduit opposite said flanged end.

In order to actuate all the valves simultaneously, said stems 32 may be connected to a single ring or spider 33, which may be slidably supported in connection with the manifold body by pins 34 projecting axially therefrom. In order that different amounts of mixture may flow into the different engine valves 16, as the physical condition of the different chambers 10 and their plugs 20 may possibly necessitate to provide proper combustion and an even power output, the stems 32 slidably project through the spider and are provided beyond the spider with adjusting nuts or collars 35. While all valves 31 will be completely closed by their springs with proper movement of the spider in the corresponding direction, the adjusting nut on any valve stem may be set so that the initial movement of the spider in an opening direction will not move the corresponding valve from its closed position. Thus, when the spider is moved sufficiently to open all the valves, said one adjusted valve will not admit as much mixture as the others, since it will not have been opened as far.

Each compressor includes a rotor and a housing. The rotor comprises an endless circular band 36 concentric with the shaft 1 and a plurality of spokes 37 radiating from a hub 38 keyed on said shaft. The housing comprises a fixed body member 39 having a circumferential bore disposed in eccentric relation to the rotor band and shaft so that said bore will be substantially tangent to and contact the band at one point, at which point transverse sealing bars 40 are mounted in the housing. Skirts 41 project radially inward from the member 39 so as to overlap the rotor band, segmental sealing bars 42 being mounted in the sides of the band and engaging said skirts.

Vanes 43, fitting closely between the skirts, are slidably mounted in the spokes and are urged radially out by suitable means, such as springs 44. The vanes on their outer end are provided with rockably mounted transverse heads 45 so as to conform to and snugly engage the eccentric bore of the housing. The vanes, as well as the heads, are provided with sealing bars 46 down their sides. The vanes, rotor band, and housing parts thus provide a plurality of separate substantially pressure-tight air pockets between and all around the housing and rotor. On the trailing side of the point of tangency of the rotor and housing, and adjacent said point, the housing is provided with a radial outlet 47 to which the corresponding conduit F is connected.

The body member 39 from a point a short distance ahead of the point of tangency to adjacent the point of greatest separation of the housing and rotor, is provided with a row of radial intake openings 48, communicating with an enclosed plenum chamber 49 formed with and surrounding the corresponding portion of the housing. This chamber is connected at several points in its circumferential extent with the outlets of a manifold 50 which is connected to the corresponding lateral of the mixture supply manifold C. The mixture is thus delivered simultaneously into the chamber at various points in its length, assuring an even distribution of the mixture therein throughout its extent.

By reason of this arrangement the chamber 49 is always completely filled with mixture under a certain initial pressure as created by the supercharger E, so that the individual pockets between the rotor advance will become completely filled with the mixture at their point of maximum capacity, or by the time the corresponding leading vane of each pocket reaches its point of maximum advance from the rotor, and without any friction being produced by the dragging-in action being necessary.

As soon as the vanes pass beyond the chamber 49 and the row of openings 48, the mixture in the pockets between the vanes becomes further compressed with the gradual reduction in size of said pockets, until the mixture under full compression is discharged through the outlet 47 and passes through conduit F to the manifold and reservoir unit G.

From the foregoing description it will be readily seen that we have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described our invention what we claim as new and useful and desire to secure by Letters Patent is:

An internal combustion engine having a plurality of firing chambers, a separate fuel mixture supply conduit communicating with each such chamber, a normally spring closed valve in each conduit, a single member common to all the conduit valves and operable to effect the opening of all thereof, and an adjustment means between each such conduit valve and such member effective to permit the operation of said member to open the several conduit valves in differing degrees whereby to admit differing amounts of the fuel mixture to the corresponding firing chambers, respectively, such adjustment means comprises a stem projecting from each valve, all of said stems projecting freely through such member, and an adjustable stop on the outer end of each stem, the member being movable against the stops to exert a pull on the stems to effect the said opening of the valves.

LUTHER S. BROWN.
KENNETH R. BROWN.
FORREST L. BROWN.